United States Patent [19]
Narukami

[11] Patent Number: 5,735,474
[45] Date of Patent: Apr. 7, 1998

[54] METHOD FOR FORWARDING AND REWINDING PHOTOSENSITIVE MATERIAL

[75] Inventor: Shinji Narukami, Wakayama, Japan

[73] Assignee: Noritsu Koki Co., Ltd., Wakayama, Japan

[21] Appl. No.: 708,824

[22] Filed: Sep. 9, 1996

[30] Foreign Application Priority Data

Sep. 11, 1995 [JP] Japan .................. 7-233077
Sep. 11, 1995 [JP] Japan .................. 7-233078

[51] Int. Cl.⁶ .................................. G03B 27/00
[52] U.S. Cl. .................. 242/332.2; 242/417; 242/418; 226/91; 226/118; 396/409
[58] Field of Search ................. 242/332, 332.2, 242/348.3, 417, 418, 534, 535, 535.2, 535.3, 563, 564.3, 564.4; 226/91, 92; 355/27, 28; 396/409

[56] References Cited

U.S. PATENT DOCUMENTS

| | | | |
|---|---|---|---|
| 3,893,360 | 7/1975 | Yano et al. ................. | 83/203 |
| 4,025,005 | 5/1977 | Fleck et al. ................ | 226/176 |
| 4,115,817 | 9/1978 | Suzuki et al. ............... | 358/288 |
| 4,327,878 | 5/1982 | Fauchier, II et al. . | |
| 4,469,291 | 9/1984 | Treiber et al. .............. | 226/118 |
| 5,065,178 | 11/1991 | Awazu et al. ............... | 355/27 |
| 5,181,066 | 1/1993 | Ozawa et al. ............... | 355/27 |
| 5,362,008 | 11/1994 | Nagel et al. ................ | 242/417 |
| 5,617,986 | 4/1997 | Kawamura .................. | 226/91 |

FOREIGN PATENT DOCUMENTS

| | | | |
|---|---|---|---|
| 63-123749 | 5/1988 | Japan ................. | 242/418 |
| 2-100949 | 4/1990 | Japan ................. | 242/332.2 |
| 6-127802 | 5/1994 | Japan ................. | 242/535.1 |

*Primary Examiner*—John P. Darling
*Attorney, Agent, or Firm*—Armstrong, Westerman, Hattori, McLeland & Naughton

[57] ABSTRACT

A method for moving a photosensitive strip material for treatment either forwardly or reversely in a photoprocessing apparatus in which the photosensitive material is moved either from or to a magazine for storing the photosensitive material wound in a form of a roll which includes driving the strip moving mechanism at a plurality of strip-moving speeds. The strip, prior to stopping, is moved at a low speed and is stopped by braking from the low-speed state so that slack inside the magazine can be absorbed and, at the same time, slack is not generated inside the magazine. Consequently, abnormal noise or damage to the strip generated from inside the magazine is eliminated.

4 Claims, 2 Drawing Sheets

METHOD FOR FORWARDING AND REWINDING PHOTOSENSITIVE MATERIAL

BACKGROUND OF THE INVENTION

The present invention relates to a method for forwarding photosensitive material (hereinafter simply referred to as the "forwarding method") and a method for rewinding photosensitive material (hereinafter simply referred to as the "rewinding method") in a photo-processing apparatus, and, more particularly, to a method for forwarding photosensitive material from a magazine to a printing part of the photo-processing apparatus and a method for rewinding unexposed photosensitive material around a magazine from the printing part of the photo-processing apparatus.

For a photo-processing apparatus, there is an apparatus which forwards a photographic paper (paper) as photosensitive material from a magazine, which stores the paper in a form of a roll, prints images recorded on the developed film; develops the paper with the images printed; and then, after drying the paper, cuts it into a specified size for every frame. In forwarding the paper, the apparatus provides friction (load) to the magazine core to prevent excessive rotation of the paper roll, and rotates the paper roll while synchronizing the paper forwarding mechanism.

However, because the inertia working on the paper varies in accordance with the paper rewinding diameter when paper is being forwarded, it is difficult to set friction, causing problems in that excessively heavy friction allows an excessively large load to work on the motor for providing rotation to the paper core and motor durability lowers. Contrariwise, excessively light friction of the core causes the paper to become slack in the magazine. Forwarding the slacked paper, as it is at a high speed, causes a problem that an abnormal, "pow", or snap noise is generated when paper finishes stretching.

On the other hand, in the photo-processing apparatus, the magazine is replaced when paper width or material is chosen. When the magazine is replaced, the paper of an unexposed part forwarded from the magazine is rewound into the magazine by rotation of the core until a paper tip end slightly protrudes from a light shielding slit of the magazine (Japanese Examined Utility Model Publication No. 12990/1995).

The rewinding of the paper by the core does not cause any problem when the paper roll is small.

However, there is a case in which the paper roll is increased by increasing the paper length in order to reduce the paper replacing frequency. In such case, since a large inertia is applied to the paper when the paper is rewound, it is difficult to stop the paper tip end in front of the light-shielding slit so that the tip end is held inside the magazine. When the paper is held inside the magazine, the magazine must be detached from the photo-processing apparatus, and the paper tip end must be pulled out from the magazine light shielding slit to set the paper tip end again in a protruding condition.

Accordingly, it is an object of the present invention to provide a forwarding method which can smoothly forward photosensitive material from the magazine.

It is another object of the present invention to provide a rewinding method which can accurately stop a tip end of an unexposed photosensitive material in front of the magazine.

SUMMARY OF THE INVENTION

In accordance with the present invention, there is provided a method for forwarding a photosensitive material in a photo-processing apparatus in which the photosensitive material is forwarded from a magazine for storing the photosensitive material wound in a form of a roll for, treatment, characterized by providing a plurality of forwarding speeds of the photosensitive material.

It is preferable that the forwarding speed of the photosensitive material is low at a start of the forwarding of the photosensitive material.

In addition, it is preferable that the forwarding of the photosensitive material stops from a low speed when the forwarding of photosensitive material is stopped.

In accordance with the present invention, there is further provided a method of rewinding a photosensitive material in a photo-processing apparatus in which the photosensitive material is delivered from the magazine for storing the photosensitive material wound in a form of a roll for treatment, characterized by providing a plurality of rewinding speeds of the photosensitive material when the photosensitive material forwarded from inside the magazine is rewound into the magazine.

In accordance with the present invention, there is also provided a method of rewinding a photosensitive material in a photo-processing apparatus in which the photosensitive material is forwarded from the magazine for storing the photosensitive material wound in a form of a roll for treatment, characterized by rewinding the photosensitive material forwarded from inside the magazine at a high speed, then switching to a low speed, and stopping at a position near a light-shielding slit of the magazine when the photosensitive material is wound into the inside of the magazine.

In accordance with the present invention, there is still further provided a method of rewinding a photosensitive material in a Photo-processing apparatus in which the photosensitive material is forwarded from the magazine for storing the photosensitive material wound in a form of a roll for treatment, characterized by successively providing a forwarding mechanism, and first and second detectors for detecting a tip end of the photosensitive material in front of a magazine light shielding slit; and, when the photosensitive material forwarded from inside the magazine is rewound in the magazine, rewinding the photosensitive material at a high speed by the forwarding mechanism until the tip end of the photosensitive material is detected by the second detector, and, after the tip end passes the second detector, switching the speed to a low speed, and applying a brake when the photosensitive material passes the first detector to allow the tip end to stop at a position of the forwarding mechanism.

DETAILED DESCRIPTION OF THE INVENTION

Referring now to the accompanying drawings, the forwarding and rewinding methods according to the present invention will be described in detail.

Figure 1:
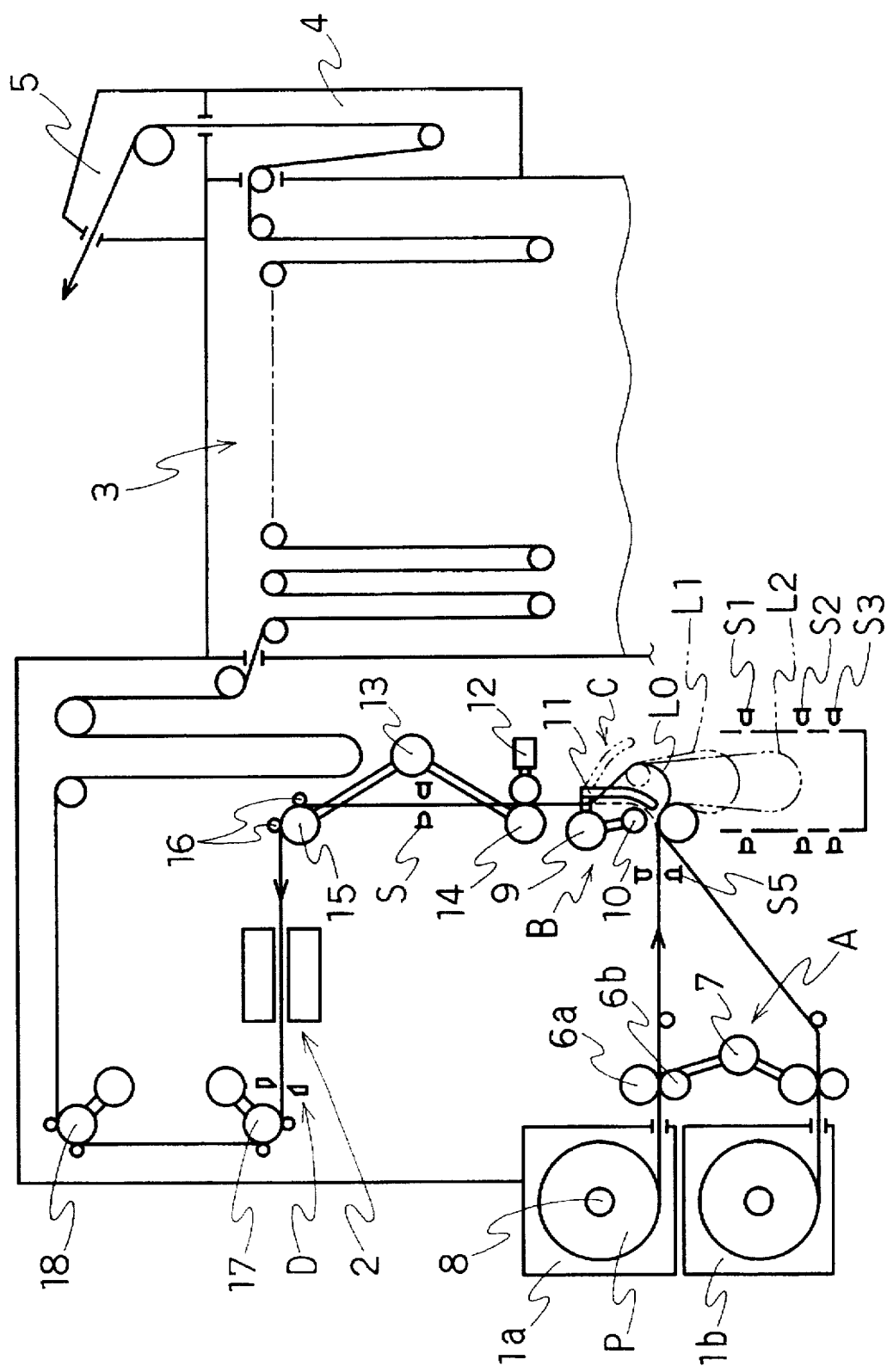
FIG. 1 is an explanatory view showing one embodiment of a photo-processing apparatus related to the forwarding and rewinding methods according to the present invention.

FIG. 1 is an explanatory view showing one embodiment of a photo-processing apparatus related to the forwarding method according to the present invention.

The forwarding method according to the present invention is, for example, applied to the photo-processing apparatus shown in FIG. 1. Such photo-processing apparatus is equipped with a printing part 2 for forwarding paper P from a magazine storing paper P in a form of a roll and printing image information recorded on the developed film on this paper, a developing part 3 for developing the printed paper P, a drying part 4 for drying the developed paper P, and a cutting part 5 for cutting the dried paper P into a specified size for every frame. To this photo-processing apparatus, two magazines 1a, 1b are set. This is to reduce load of magazine replacement work and improve work efficiency by automatically switching to paper P of the other magazine 1b when paper P of one magazine 1a is exhausted or paper is changed to that of different width or kind. However, in the present invention, the number of magazines is not restricted to The magazine 1a is housed in a light-shielded casing, and paper P pulled out from the inside of magazine 1a is forwarded by a forwarding mechanism A comprising a pair of conveying rollers 6a, 6b and a driving motor 7 for rotating and driving the conveying roller 6a to be fed to the printing part 2.

Next, the forwarding method according to the present invention will be described. In the present invention, the paper forwarded from the magazine is designed to be looped temporarily and then fed to the printing part. This is to reduce the forwarding speed of the driving motor 7 at the start and to enable stopping of paper forwarding independently from another conveying motor by forming a loop.

First, as shown in FIG. 1, the tip end of paper P stored in the magazine 1a is pulled out and inserted between a pair of conveying rollers 6a, 6b of the forwarding mechanism A. Then, at a low speed (for example, 250 mm/sec), paper P is allowed to pass a loop mechanism B and is fed, for example, for a distance of 100 mm after the sensor S is shaded, with a loop forming amount by dead weight, later described, taken into account, and then the forwarding of paper P is stopped. Because paper P is forwarded at a low speed in this event, it is possible to absorb the slacking portion inside the magazine 1a and prevent abnormal noise or damage to the paper, and because paper P is stopped from a low speed, the inertia of the paper roll on the core 8 can be lowered and the slack of paper P inside the magazine 1a can be eliminated. Then, a motor 9 of the loop mechanism B is driven to rotate and move the conveying roller 10 and conveying guide 11 as shown by phantom lines indicated as C. This rotational movement allows paper P to form a loop L0 by its dead weight. Then, a clamping solenoid 12 operates to hold paper P. Thereafter, the driving motor 7 is driven to forward paper P, allowing loop L2 to be formed until a sensor S2 is shaded. The paper P forwarding speed in this event can be designed to be high speed (for example, 650 mm/sec) because paper P is stopped from a low speed so that paper P in the magazine 1a is free from slackness. After the loop L2 is formed, the paper forwarding speed returns to a low speed, and then, conveying rollers 14, 15 are driven at a slow speed (for example, 180 mm/sec) to forward the paper P tip end to the position of conveying roller 17. To the paper thus forwarded, film image information is printed on every frame in the printing part 2. Because, in the present invention, the forwarding speed at a low speed by the forwarding mechanism A is designed to be greater than the conveying speed at a low speed by the conveying motor 13, the sensor S3 is certain to be shaded at the start of forwarding. When the sensor S3 is shaded by paper P in the form of a loop, forwarding of paper P by conveyor roller 6a is stopped from a low speed. Then, the paper is successively conveyed by conveying rollers 14 and 15 and the driving motor 7 is kept stopped even when the sensor 53 becomes transmissible, and when the sensor S2 becomes transmissible, forwarding of paper P by roller 6a is switched from stop to low speed. Until the tip end of paper P enters between conveying rollers 18 via the conveying roller 17, the forwarding accuracy must be improved for preventing slack and bulging of paper, accurately positioning the paper to the exposing position as well as forming punch holes with good positional accuracy. For this purpose, the paper conveying speed by the conveying motor 13 is designed to be slower than the forwarding speed (250 mm/sec) of paper P, by roller 6a for example, 180 mm/sec. Then, after the tip end of paper P enters the conveying rollers 18, the conveying speed by the conveying motor 13 is switched to high speed, for example, 630 mm/sec in order to improve paper treatment work. In this case, if paper P assumes the loop L1 condition and the sensor S1 becomes transmissible, the paper forwarding speed generated by motor 7 is switched to high speed and, when the sensor S2 is shaded, it returns to low speed. If the sensor S3 becomes shaded, the driving motor 7 is stopped. Consequently, once the speed is switched to a low speed, the speed is not switched to a high speed unless the sensor S1 becomes transmissible. Repeating the above operations, the printing work continuously takes place.

The forwarding method according to the present invention is not limited to the paper forwarding but can be applied similarly to the forwarding of film from the magazine.

Now, the rewinding method according to the present invention is described. The rewinding method is applied, for example, to the photo-processing apparatus as shown in FIG. 1, like in the above-mentioned forwarding method.

The rewinding method according to the present invention is, for example, applied to the photo-processing apparatus shown in FIG. 1. Such photo-processing apparatus is equipped with a printing part 2 for forwarding paper P from a magazine storing paper P in a form of roll and printing image information recorded on the developed film to this paper, a developing part 3 for developing the printed paper P, a drying part 4 for drying the developed paper P, and a cutting part 5 for cutting the dried paper P into a specified size for every frame. To this photo-processing apparatus, two magazines 1a, 1b are set. This is to reduce load of magazine replacement work and improve work efficiency by automatically switching to paper P of the other magazine 1b when paper P of one magazine 1a is exhausted, or paper is changed to that of different width or kind. However, in the present invention, the number of magazines is not restricted to two.

The magazine 1a is housed in a light-shielded casing, and paper P pulled out from the inside of magazine 1a is forwarded by a forwarding mechanism A comprising a pair of conveying rollers 6a, 6b and a driving motor 7 for rotating and driving the conveying roller 6a to be fed to the printing part 2.

Next, the rewinding method according to the present invention will be described. In the present invention, the paper forwarded from the magazine is designed to be looped temporarily and then fed to the printing part. This is to reduce the forwarding speed of the driving motor 7 at the start and the stop of paper forwarding independently from another conveying motor by forming a loop.

First, as shown in FIG. 1, the tip end of paper P stored in the magazine 1a is pulled out and inserted between a pair of conveying rollers 6a, 6b of the forwarding mechanism A.

Then, at a low speed (for example, 250 mm/sec), paper P is allowed to pass a loop mechanism B and is fed, for example, for 100 mm after the sensor S is shaded, with a loop forming amount by dead weight later described taken into account, and then the forwarding of paper P is stopped. Because paper P is forwarded at a low speed in this event, it is possible to absorb the slacking portion inside the magazine 1a and prevent abnormal noise or damage to paper, and because paper P is stopped from a low speed, the inertia of paper roll (core) 8 can be lowered and slack of paper P inside the magazine 1a can be eliminated. Then, a motor 9 of the loop mechanism B is driven to rotate and move the conveying roller 10 and conveying guide 11 as shown by phantom lines indicated as C. This rotational movement allows paper P to form a loop L0 by its dead weight. Then, a clamping solenoid 12 operates to hold paper P. Thereafter, the driving motor 7 is driven to forward paper P, allowing loop L2 to be formed until a sensor S2 is shaded. The paper P forwarding speed in this event can be designed to be high speed (for example, 650 mm/sec) because paper P is stopped from a low speed so that paper P in the magazine 1a is free from slackness. After the loop L2 is formed, the paper forwarding speed returns to a low speed, and then, conveying rollers 14, 15 are driven at a slow speed (for example, 180 mm/sec) to forward the paper P tip end to the position of conveying roller 17. To the paper thus forwarded, film image information is printed every frame in the printing part 2. Because in the present invention, the forwarding speed at a low speed by the forwarding mechanism A is designed to be greater than the conveying speed at a low speed by the conveying motor 13, the sensor S3 is certain to be shaded at the start of forwarding. When the sensor S3 is shaded by paper P in the form of loop, forwarding of paper P is stopped from a low speed. Then, the paper is successively conveyed with conveying rollers and the driving motor 7 is kept stopped even when the sensor S3 becomes transmissible, and when the sensor S2 becomes transmissible, forwarding of paper P from magazine 1a is switched from stop to low speed. Until the tip end of paper P enters between conveying rollers 18 via the conveying roller 17, the forwarding accuracy must be improved for preventing slack and bulging of paper, accurately position the paper to the exposing position as well as forming punch holes with good positional accuracy. For this purpose, the paper P conveying speed by the conveying motor 13 is designed to be slower than the forwarding speed (250 mm/sec) of paper P, for example, 180 ram/sec. Then, after the tip end of paper P enters the conveying rollers 18, the conveying speed by the conveying motor 13 is switched to high speed, for example, 630 mm/sec in order to improve paper treatment work. In this case, if paper P assumes the loop L1 condition and the sensor S1 becomes transmissible, the paper P forwarding speed is switched to high speed and when the sensor S1 is shaded, it becomes low speed. If the sensor S3 becomes shaded, the driving motor 7 is stopped. Consequently, once the speed is switched to a low speed, the speed is not switched to a high speed unless the sensor S1 becomes transmissible. Repeating the above operations, the printing work is continued.

Next, when printing work is finished or the kind of paper is changed, an unexposed paper is rewound in the magazine.

Figure 2A:
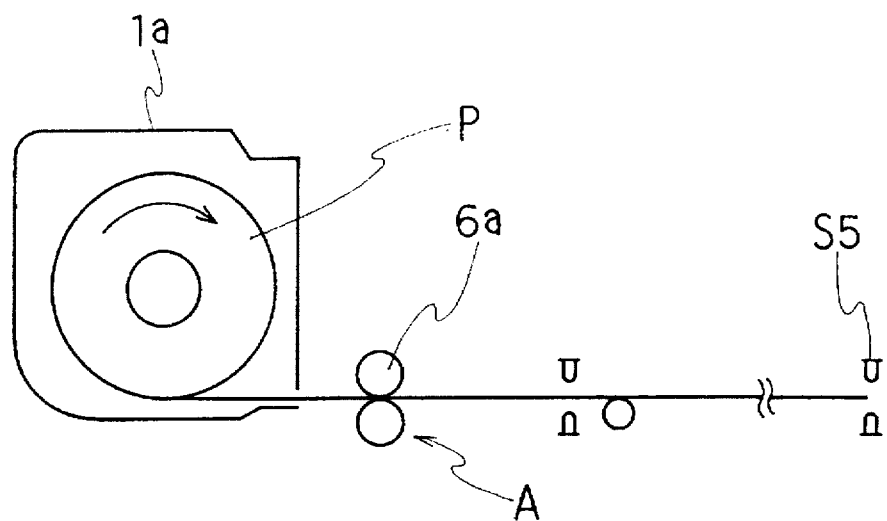
FIGS. 2a, 2b and 2c are explanatory views showing operation of the rewinding method according to the present invention.
Figure 2B:
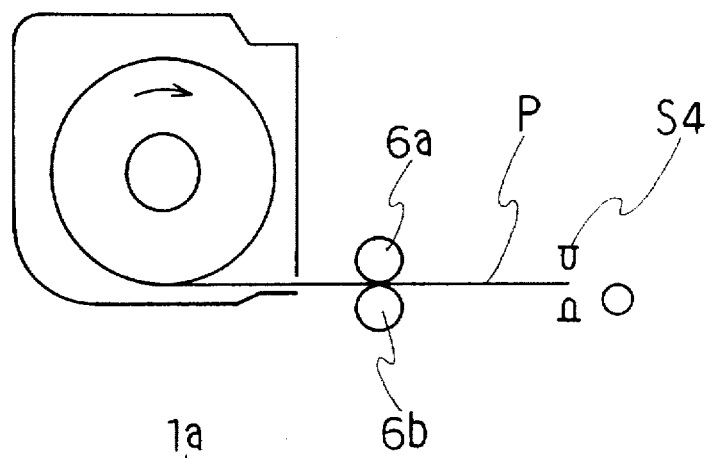
Figure 2C:
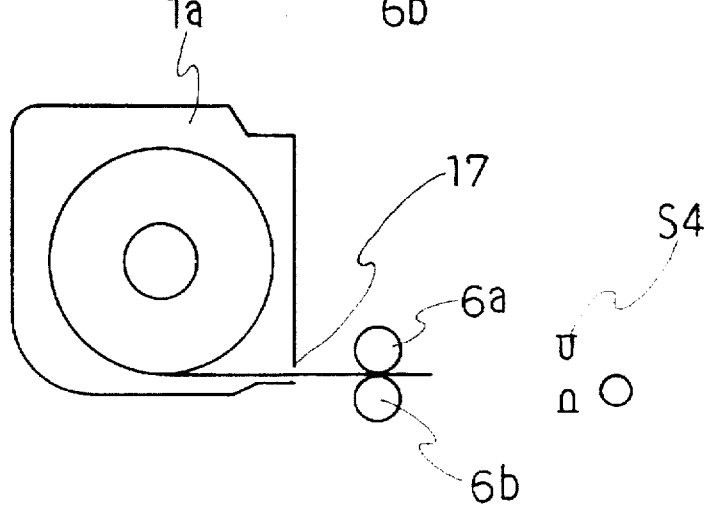

First of all, the exposed paper at the printing part 2 is sent to the cutting position D and separated from the unexposed paper P. The conveying roller 6a is rotated at a high speed in the reverse direction by the driving motor 7 of the forwarding mechanism A and the loop-form paper P is rewound in the magazine 1a. Then, when the loop L2 causes light to transmit to the sensor S2, the driving motor 7 is stopped and conveying rollers 14, 15 are rotated reversely by the conveying motor 13. When the sensor S3 is shaded, driving of conveying rollers 14, 15 is stopped, and instead, the conveying roller 6a is rotated again at a high speed. In this way, based on the detection of sensors S2 and S3, the conveying rollers 14, 15 and conveying roller 6a are reversely rotated alternately to rewind paper P in the magazine 1a. When the sensor S becomes transmissible, the clamping solenoid 12 is turned off, the conveying rollers 14, 15 are stopped, and the conveying roller 6a is rotated at a high speed. When the sensor S5, the second detector for detecting the wait position of paper conveying, becomes transmissible, as shown in FIG. 1 and FIG. 2a, the driving motor 7 is switched to a low speed. Next, as shown in FIG. 2b, when the tip end of paper P passes sensor S4, the first detector, reverse rotation drive of the driving motor 7 is stopped and brakes are applied to paper P with rollers 6a, 6b. In this event, as shown in FIG. 2c, the tip end of paper P would pass between conveyor rollers 6a and 6b by inertia of paper P inside the magazine 1a to be rewound, but the tip end of paper P does not go over conveyor rollers 6a, 6b and enter the light shielding slit 17. The tip end of paper P stops at the position of conveying rollers 6a, 6b. For conditions for stopping the paper P tip end between the sensor S4 and conveying rollers 6a, 6b, $L > vt - \frac{1}{2}\alpha t^2$ (v: low rewinding speed, $\alpha$: deceleration by brakes, t: time) can be employed when the distance between rollers 6a, 6b and sensor S4 is designated to be L.

The rewinding method according to the present invention is not limited to rewinding of paper but can be applied similarly to rewinding of film into the magazine.

As described above, according to the forwarding method of the present invention, paper is forwarded at a low speed at the start of forwarding, and conversely it is stopped from the low-speed state when the forwarding is stopped, so that slack inside the magazine can be absorbed and at the same time, slack is not generated inside the magazine. Consequently, abnormal noise or damage to paper generated from the magazine inside is eliminated. Because a load during paper conveyance becomes constant, accuracy of paper conveying amount is improved.

Further, according to the rewinding method of the present invention, speeds are set in multiplicity, for example, after rewinding at a high speed, the speed is switched to a low speed, then brakes are applied to paper to stop the paper tip end in front of the light shielding slit. Consequently, it is possible to shorten the working time by setting the speed to high speed up to the middle of rewinding, which does not contribute to production. It is also possible to reduce paper inertia because brakes are applied to stop operation by switching high speed to low speed. As a result, it is possible to improve accuracy of the paper stopping position.

What is claimed is:

1. A method of rewinding a photosensitive material in a photo-processing apparatus in which the photosensitive material is forwarded from a magazine for storing the photosensitive material wound in a form of a roll for treatment, characterized by successively providing a forwarding mechanism, first and second detectors for detecting a tip end of the photosensitive material in front of a magazine light shielding slit, and, when the photosensitive material forwarded from inside the magazine is rewound in the magazine, rewinding the photosensitive material at a high speed with the forwarding mechanism until the tip end of the photosensitive material is detected by the second detector, and, after the tip end passes the second detector, switching the speed to a low speed, and applying brake when the photosensitive material passes the first detector to allow the tip end to stop at a position of the forwarding mechanism.

2. A method for forwarding a photosensitive strip material from a wound roll stored in a magazine to an object conveyor for treatment in a photo-processing apparatus, which apparatus includes a loop-forming mechanism, and a strip-forwarding mechanism drivable at a plurality of speeds comprising the steps of:

driving said strip-forwarding mechanism initially at a low speed to deliver strip material to a loop-forming mechanism to form a loop of strip material therein; and varying the driving speed of said strip-forwarding mechanism in response to the amount of strip material delivered to said loop-forming mechanism; and stopping the delivery of strip by said strip-forwarding mechanism only when said strip-forwarding mechanism is driven at low speed.

3. A method for forwarding a photosensitive material to an object conveyor for treatment in a photo-processing apparatus having a magazine for storing the photosensitive material wound in the form of a roll, a loop-forming mechanism, a loop-forwarding mechanism including a first drive motor operable at plural speeds for forwarding photosensitive material from said loop-forwarding mechanism and a conveying mechanism including a second drive motor operable at plural speeds for conveying photosensitive material from said loop-forming mechanism to an object conveyor, comprising the steps of:

driving said forwarding mechanism at a first speed to move said photosensitive material through said loop-forming mechanism to said conveying mechanism, said first speed being sufficiently low to prevent slacking of said photosensitive material in said magazine;

stopping said forwarding mechanism;

operating said loop-forming mechanism to produce a loop in said photosensitive material;

clamping said photosensitive material between said loop-forming mechanism and said conveying mechanism;

driving said forwarding mechanism at a speed greater than said first speed for moving said photosensitive material to increase the size of the loop in said loop-forming mechanism by a predetermined amount and, thereafter, reducing the speed of said forwarding mechanism to said first speed;

unclamping said photosensitive material and driving said conveying mechanism at a first speed slower than the first speed of said forwarding mechanism;

stopping said forwarding mechanism when the size of the loop achieves a maximum size while continuing to drive said conveying mechanism until said photosensitive material reaches said object conveyor; and driving both said forwarding mechanism and said conveying mechanisms each at second speeds which are greater than the first speeds thereof for conveying said photosensitive material for treatment.

4. A method of rewinding a photosensitive strip material into a magazine in which it is stored as a wound roll and unwound therefrom to an object conveyor for treatment by a photo-processing apparatus including a strip-forwarding mechanism drivable at a plurality of speeds, a conveying mechanism drivable at a plurality of speeds, a loop-forming mechanism located between said strip forwarding mechanism and said conveying mechanism, and a plurality of strip sensing sensors including sensors in said loop-forming mechanism and at least two sensors between said loop-forming mechanism and said magazine, said method comprising the strips of:

driving said conveying mechanism in a reverse direction to generate a loop of strip material in said loop-forming mechanism and stopping said conveying mechanism when said sensing means detects a first predetermined amount of looped strip material in said loop-forming mechanism;

driving said forwarding mechanism in a reverse direction at a high speed when said conveying mechanism is stopped and said sensing means does not detect a second predetermined amount of strip material in said loop-forming mechanism, alternately stopping and reversely driving said conveying mechanism and said forwarding mechanism in response to the amount of strip material determined by said sensors to be in said loop-forming mechanism;

reversely driving said forwarding mechanism at a low speed when a first of said sensors between said loop-forming mechanism and said magazine detects an absence of strip material; and stopping the driving of said forwarding mechanism when a second of said sensors between said loop-forming mechanism and said magazine detects an absence of strip material.

* * * * *